(No Model.)

G. M. STRATTON.
LIGATURE RECEPTACLE.

No. 554,040. Patented Feb. 4, 1896.

Witnesses:
Jno. E. Parker
J. Henderson

Inventor:
George M. Stratton,
by his Attorney,
Horace Pettit

UNITED STATES PATENT OFFICE.

GEORGE M. STRATTON, OF BRIDGEPORT, PENNSYLVANIA, ASSIGNOR TO THE AMERICAN SURGICAL COMPANY, OF PENNSYLVANIA.

LIGATURE-RECEPTACLE.

SPECIFICATION forming part of Letters Patent No. 554,040, dated February 4, 1896.

Application filed March 18, 1895. Serial No. 542,140. (No model.)

*To all whom it may concern:*

Be it known that I, GEORGE M. STRATTON, of Bridgeport, county of Montgomery, State of Pennsylvania, have invented a certain new and useful Improvement in Ligature-Receptacles, of which the following is a full, clear, and exact description, reference being had to the accompanying drawings, forming part of this specification.

My invention has relation to improvements in surgical ligature-receptacles, and has as its chief characteristic, in combination with an open-mouth ligature-receptacle, having a removable cap, a removable spool-shaped support having upper and lower flanges of a diameter about equal to the inner diameter of the casing and a vertically-disposed spindle formed integral with said flanges, a rotatable spool axially provided upon said spindle and between the upper and lower flanges of the spool-shaped device, and a rubber disk with its outer edges impinging upon the inner walls of the mouth of the receptacle is provided to press upon the outer face of the upper flange of the support to hold the same in position, and at the same time to retain the antiseptic fluid.

Figure 1:
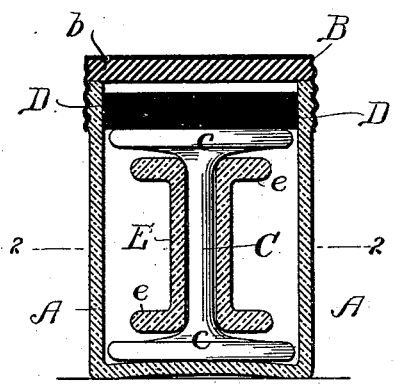
Figure 2:
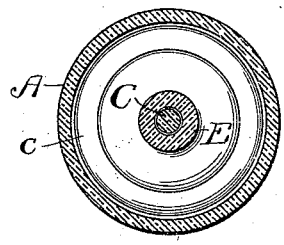

In the accompanying drawings, Figure 1 is a sectional elevation of a ligature-receptacle constructed in accordance with my invention; and Fig. 2 is a sectional plan view of the same on the line 2 2, Fig. 1.

Referring to the drawings, A represents an open-mouthed cylindrical vessel formed of glass, and provided at its upper end with screw-threads, on which may screw a metallic or other covering-cap B, provided with an inner disk $b$ of rubber, or similar elastic material, which, when the cap is screwed into position, firmly presses against the open mouth of the bottle and prevents all danger of leakage of the antiseptic fluid with which the bottle is filled.

In the center of the bottle is placed a spindle C, provided at top and bottom with integral flanges $c$ of a diameter nearly equal to the inner diameter of the bottle, so that it will be impossible for the spindle to move any considerable distance from its proper position in the center of the bottle.

The spindle C is to some extent held in proper position in the center of the bottle or receptacle A by means of a circular disk D, formed of rubber or some equivalent material, which fits closely within the neck of the bottle and presses firmly upon the upper flange $c$ of the spindle, such upper flange being, as before described, of a diameter nearly equal to the inner diameter of the neck of the bottle, so that the area of rubber exposed to the action of the antiseptic fluid will be quite small and any deteriorating chemical action will be prevented.

On the spindle C is mounted a spool E, on which the ligatures are wound, the ends of the ligatures being drawn out of the bottle between the edge of the rubber disk D and the inner wall of the bottle.

In mounting the spool upon the spindle C, the spool being first formed with a central opening of a diameter somewhat greater than the diameter of the spindle C, I take a rod or tube of glass to form the spindle, and, after heating the end of the rod, upset said end to form the lower flange $c$. The spool is then placed on the rod and the rod heated at its opposite end, and this end is also upset to form the upper end flange, when the spindle and its spool are complete, and in readiness to be supplied with the ligature.

In upsetting the ends of the rod care is taken to form the end flanges $c$ of a diameter nearly equal to the inner diameter of the bottle, so that the spindle is prevented from moving laterally to an extent sufficient to bring the flanges $e$ of the spool E into contact with the inner wall of the bottle and but a small area of the rubber disk D will be exposed when the parts are assembled in the bottle A.

Having thus described my invention, what I claim, and desire to secure by Letters Patent, is—

The combination in a ligature-receptacle, of an open-mouthed glass bottle, A, a closing-cap therefor, ligature-holding spool, E, a supporting-spindle, C, therefor, said supporting-spindle having integral top and bottom flanges, c, of a diameter nearly equal to the inner diameter of the bottle so as to keep the spindle in a central or nearly central position and keep the flanges of the ligature-holding spool from contact with the inner wall of the bottle, substantially as specified.

In witness whereof I have hereunto set my hand this 8th day of March, A. D. 1895.

GEORGE M. STRATTON.

Witnesses:
EDMUND S. MILLS,
J. HENDERSON.